United States Patent [19]

Wolff

[11] 3,861,619

[45] Jan. 21, 1975

[54] MAGNETIC TAPE POSITION SENSING

[75] Inventor: Robert E. Wolff, Edina, Minn.

[73] Assignee: Minnesota Mining and Manufacturing Company, St. Paul, Minn.

[22] Filed: Nov. 2, 1972

[21] Appl. No.: 303,096

[52] U.S. Cl. .................................. 242/188, 360/72

[51] Int. Cl. ...... B65h 59/38, G03b 1/04, G11b 1/52

[58] Field of Search ..... 242/55.19 A, 188, 197–200; 179/100.2 S, 100.2 Z; 346/78

[56] References Cited

UNITED STATES PATENTS

| | | | |
|---|---|---|---|
| 3,053,140 | 9/1962 | Brogan et al. | 242/199 X |
| 3,497,157 | 2/1970 | Hanes et al. | 242/188 |
| 3,615,155 | 10/1971 | Gelbman | 242/188 |

*Primary Examiner*—Leonard D. Christian
*Attorney, Agent, or Firm*—Alexander, Sell, Steldt & DeLaHunt

[57] ABSTRACT

A length of magnetic tape extending along a tape path in a cartridge shell and having its ends wound one on each of a pair of reel hubs is formed adjacent each end with a repetitive pattern of holes. The patterns of holes at the two ends of the tape are different to distinguish the ends from each other and two additional sets of holes located more centrally of the length of tape than and distinguishable from the repetitive patterns demark the ends of the desired recording area on the length of magnetic tape. A plurality of photocells are used to detect the holes and to distinguish the repetitive patterns of holes from each other and from the additional sets of holes to provide unambiguous sensing of the beginning of tape, the end of tape and the desired recording area.

3 Claims, 4 Drawing Figures

PATENTED JAN 21 1975 3,861,619

MAGNETIC TAPE POSITION SENSING

FIELD OF THE INVENTION

The present invention relates to a magnetic tape cartridge in which the physical position of the magnetic tape may be automatically determined and from which the tape recorder functions may be automatically controlled.

BACKGROUND OF THE INVENTION

The prior art has recognized the desirability of automatic detection of the ends of the length of magnetic tape particularly in reel-to-reel tape cartridges. Reflective strips and conductive strips have been bonded to or spliced in the tape and transparent leaders have been spliced to the ends of lengths of magnetic tape to permit sensing of the ends of the tape. However, all of these solutions suffer from three defects. First, they add thickness to the tape in the area of attachment to the tape which embosses several layers of tape and can produce unreliable recording. Second, the area of attachment to the tape collects and carries debris to the magnetic head producing unreliable recording known as dropouts. Third, the area of connection to the tape is subject to and often fails under tension and/or wear in moving across the magnetic head.

It has also been recognized that in addition to the physical ends of the tape it is desirable to demark and sense the load point at which it is desired to begin recording on the length of magnetic tape and an early warning point to indicate that the end of tape is approaching and that recording should soon be terminated. The load point is spaced from the beginning of tape to permit the tape transport to reach recording speed before information is recorded and the early warning point is spaced from the end of tape to permit the completion of a message prior to reaching the end of tape.

None of the prior art methods have, however, provided unambiguous indication of the tape position. Thus, where transparent leaders are attached to the ends of the length of tape the presence of a transparent portion does not indicate which end of the tape is being sensed and the tape transport may be activated in the wrong direction and pull the tape from one of the reels. Subsequent activation of the tape transport in the opposite direction would spill tape from the fully wound reel.

The foregoing problems are particularly serious when a tape cartridge is used, since in use a cartridge is often inserted into a tape recorder in such a manner that the tape reels are not visible to the operator. Thus, manual assistance to solve any ambiguity in the tape position is not available. And, pulling of tape off a reel and/or spilling of tape into the tape recorder must be avoided.

SUMMARY OF THE INVENTION

According to the present invention there is provided a magnetic tape cartridge comprising a cartridge shell defining an enclosure, a pair of reel hubs supported within the enclosure and a length of magnetic tape extending along a tape path within the enclosure and having its ends wound one on each of the reel hubs. The length of magnetic tape is formed adjacent each end with a repetitive pattern of holes, the patterns of holes at the two ends of the tape being different to distinguish the ends of the tape from each other. And, the magnetic tape is formed with two additional sets of holes more centrally of the length of the tape than and distinguishable from the repetitive patterns, one additional set of holes being associated wth each end of the length of tape. The additional sets of holes together demark the ends of the desired recording area on the length of magnetic tape.

The present invention permits an unambiguous determination of the respective ends of the length of magnetic tape. And, it permits a positive and unambiguous determination of the desired recording area on the tape.

DESCRIPTION OF THE PREFERRED EMBODIMENT

The magnetic tape cartridge of the present invention comprises a cartridge shell 10 defining an enclosure, a pair of reel hubs 12 and 13 supported within the enclosure for free rotation about spaced parallel axes and a length of magnetic tape 15 extending along a tape path within the enclosure and having its ends wound one on each of the reel hubs 12 and 13.

Figure 1:
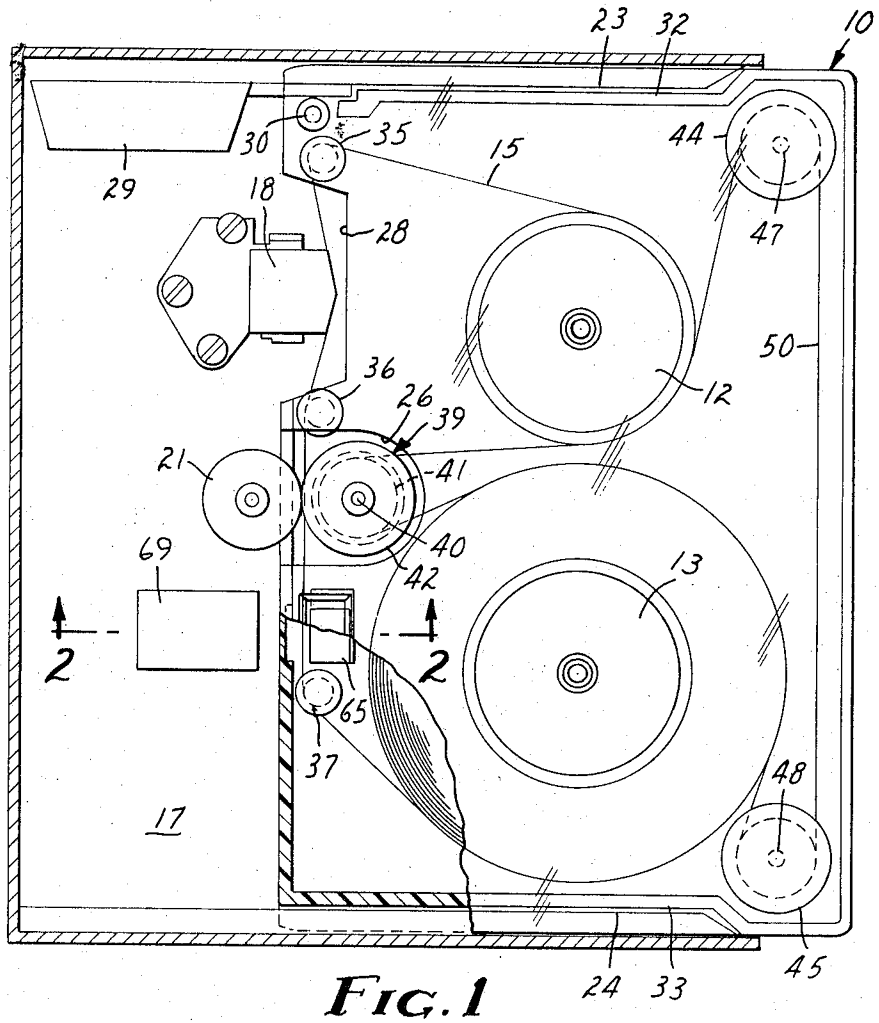
FIG. 1 is a plan view of a magnetic tape cartridge constructed in accordance with the present invention, partially in section and in position on a recording and/or reproducing machine.
Figures 2, 3:
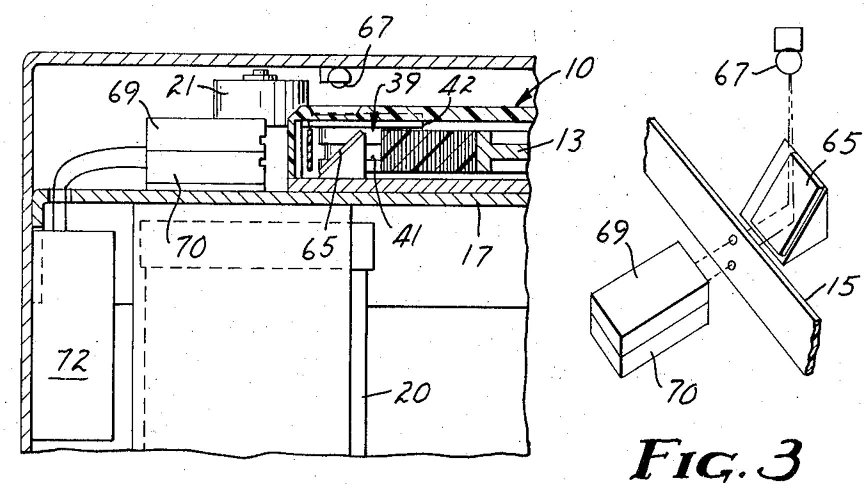
FIG. 2 is a cross-sectional view taken generally along line 2—2 of FIG. 1.
FIG. 3 is a perspective view illustrating a portion of the apparatus also shown in FIG. 2.

In FIGS. 1 and 2 the cartridge is shown in position in a recording and/or reproducing machine, hereinafter referred to as a tape recorder. The tape recorder comprises a support frame including a horizontal cartridge support deck 17 supporting a magnetic head 18 and in a depending manner supporting a reversible drive motor 20, the shaft of which extends through and carries a drive roller 21 above the support deck 17. Elongate guides 23 and 24 define the position for the cartridge on the cartridge support deck 17.

The cartridge shell 10 is formed with an opening 26 in its top wall and extending into one edge wall centrally of the length of the edge wall to provide access for the drive roller 21 of the tape recorder. The same edge wall of the cartridge shell is also formed with a cutaway portion 28 for access to the interior of the cartridge by the magnetic head 18. The cutaway portion 28 is normally covered by a door 29 which is pivoted on a stud 30 adjacent a corner of the cartridge and biased by a torsion spring toward its closed position covering the cutaway portion 28. The opposed edge walls 32 and 33 of the cartridge shell which are perpendicular to the edge wall thereof containing the cutaway portion 28 are recessed along a majority of their length to expose the base wall, and the elongate guides 23 and 24 in the recorder are formed to fit over the exposed portion of the base wall of the cartridge shell to guide the cartridge as is it inserted into the recorder. The door 29 of the cartridge shell 10 extends beyond its pivot stud 30 into the recessed portion of the adjacent edge wall 32 and the leading edge of the corresponding cartridge guide 23 in the tape recorder is beveled to pivot the door 29 to an open position against the bias of the torsion spring as the cartridge is inserted into the machine.

The magnetic tape 15 is convolutely wound on the reel hubs 12 and 13 in opposite directions about their axes. The tape guide path between the reel hubs is defined by three guide pins 35, 36 and 37, one positioned at each side of the cutaway portion 28 of the cartridge shell 10 to guide the tape from the reel hub 12 and across the cutaway portion 28, and one pin positioned at the edge of the drive roller opening 26 farthest removed from the cutaway portion 28 to guide the tape to the reel hub 13.

A belt driving roller 39 is supported for free rotation by a shaft 40 extending from the base wall of the cartridge shell 10. The belt driving roller is rotatable about an axis parallel to the axes of the reels 12 and 13 and it is positioned on the center line of the cartridge between the reel hubs. It is formed with a smaller diameter portion which has a central circumferential belt guide slot 41 in horizontal alignment with the center line of the tape guide path and a larger diameter portion 42 extending into the drive roller opening 26 in the cartridge shell 10. The larger diameter portion 42 of the belt driving roller 39 extends over the tape path between the guide pins 36 and 37 to permit driving of the belt driving roller 39 by the drive roller 21 in the tape recorder without contacting the tape 15.

A pair of belt guide rollers 44 and 45 are supported on the cartridge shell by stationary shafts 47 and 48, respectively, for rotation about axes parallel to the axis of the belt driving roller 39. The belt guide rollers 44 and 45 and their support shafts 47 and 48 are constructed of materials which have a predetermined coefficient of friction to provide a predetermined frictional coupling between each guide roller and its support shaft. The belt guide rollers are positioned at opposite corners of the cartridge shell 10 along the edge wall thereof parallel to the edge wall formed with the cutaway portion 28. Each belt guide roller is formed with a central circumferential belt guide slot in horizontal alignment with the guide slot 41 in the belt driving roller 39. The belt driving roller 39 and the belt guide rollers 44 and 45 define a belt guide path having an angle of wrap of at least 60° at the periphery of the reel hubs 12 and 13.

A thin, continuous, flexible and elastic belt 50 having a uniform cross-sectional area extends along the belt guide path around the belt driving roller 39 and the belt guide rollers 44 and 45 contacting the tape 15 on the reel hubs 12 and 13. The belt 50 has a coefficient of elasticity in the range from 0.01 to 0.25 meters per newton meter. The length of the belt 50 is less than the length of the belt guide path so that when the bbelt is stretched into position along the guide path it will have an installed tension or pretension of at least 1.6 newtons.

Rotation of the belt driving roller 39 in the clockwise direction (as viewed in FIG. 1) by the drive roller 21 causes the belt 50 to traverse its guide path in a clockwise direction and the tape 15 to move from the reel hub 12 to the reel hub 13, the reel hub 12 serving as a supply reel and the reel hub 13 serving as a take-up reel. The predetermined frictional coupling between the belt guide rollers 44 and 45 and their respective support shafts 47 and 48 applies a predetermined drag to the belt as it passes around the guide rollers, thereby increasing the tension in the belt as it passes around each of the guide rollers. This increased tension in the belt 50 increases the length of the belt, according to the elasticity of the belt, thereby increasing the speed at which the belt passes around the take-up reel 13 over that at which it passes over the supply reel 12. This increased speed causes tension in the tape 15 as well as the ability to take up any slack developed in the tape between the reel hubs. Reversal of the direction of rotation of the belt driving roller 39 (i.e., counterclockwise as viewed in FIG. 1) will result in transfer of tape from reel hub 13 to reel hub 12 with the same tape drive properties.

The length of magnetic tape 15 is formed adjacent each of its ends with a repetitive pattern of holes 53, 54, 55 and 57, 58, 59, respectively. The pattern of holes adjacent one end comprises a single hole 53, 54 or 55, the pattern being repeated three times. The pattern of holes adjacent the other end of the tape comprises two holes 57, 58 or 59 aligned across the width of the tape, the pattern being repeated three times. The patterns of single holes and double holes distinguish the ends of tape from each other.

The length of magnetic tape 15 is also formed with two additional sets of holes 61 and 63 more centrally of the length of tape and distinguishable from the repetitive patterns 53, 54, 55 and 57, 58, 59. One additional set of holes 61 or 63 is associated with each end of the length of tape, the additional sets of holes together demarking the approximate ends of the desired recording area on the length of magnetic tape 15. In the illustrated embodiment each additional set of holes comprises a single hole 61 or 63, the two holes 61 and 63 being on the same level across the width of the magnetic tape 15 between two predetermined longitudinal recording tracks on the tape. The additional sets of holes 61 and 63 are distinguishable from the single holes 53, 54, 55 at one end of the tape by being on a different level across the width of the magnetic tape 15 and they are distinguishable from the patterns of holes 57, 58, 59 at the other end of the tape by being single holes rather than pairs. The additional holes 61 and 63 are also smaller than the holes of the repetitive patterns 53, 54, 55 and 57, 58, 59 to eliminate any possibility of their interfering with the adjacent recording tracks.

A mirror 65 is supported by the cartridge shell 10 at a 45° angle to the tape path along the front edge wall of the cartridge to reflect light from a lamp 67 in the tape recorder against the rear face of the magnetic tape 15. A pair of vertically aligned photocells 69 and 70 are positioned adjacent the cartridge position to collect light reflected by the mirror 65 and transmitted through the holes in the magnetic tape 15. The upper photocell 69 is horizontally aligned with the upper course of holes through the magnetic tape 15 and the lower photocell 70 is aligned with the lower course of holes. The photocells 69 and 70 are electrically connected to a logic circuit which is illustrated schematically in FIG. 2 by the box 72.

Figure 4:
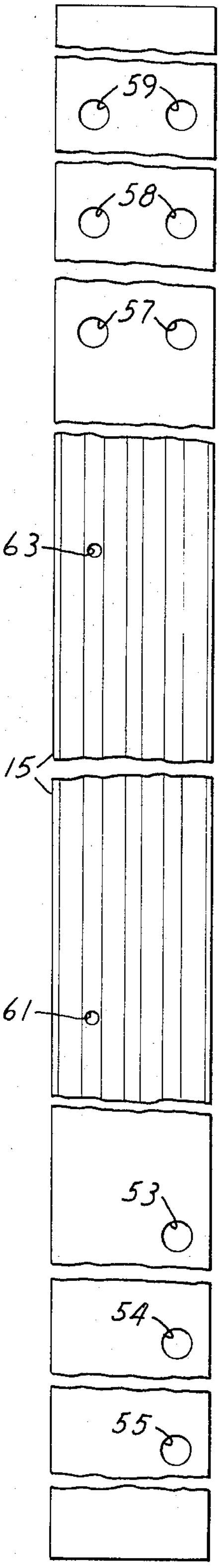
FIG. 4 is an elevation view of the length of magnetic tape in the cartridge of FIG. 1.

The logic circuit 72 provides control of the drive motor 20 and recording by the magnetic head 18. When the cartridge is inserted into the tape recorder and the tape recorder is activated, the logic circuit 72 activates the drive motor 20 to search for an end of the magnetic tape 15. For example, suppose that the hole 61 is initially adjacent the mirror 65 and the drive motor is activated to transport the magnetic tape 15 from reel 12 to reel 13. In this case the transport would continue until the hole 53 passed between the mirror 65 and the photocell 70 indicating that the left end of the tape (as viewed in FIG. 4) had been found. The logic circuit would then cause the power to be removed from the drive motor 20. Now if the cartridge is removed from the machine and reinserted the drive motor 20 may be activated in the same direction and this time sensing of hole 54 by the photocell 70 would tell the logic circuit that the left end of the length of magnetic tape 15 was present and the power to the drive motor 20 would again be removed.

Activation of the tape recorder in the recording mode will now cause the logic circuit 72 to control the drive motor 20 to drive in the opposite direction transferring tape from reel 13 to reel 12. Tape is transported without recording until the hole 61 passes between the mirror 65 and the photocell 69 at which time the logic circuit 72 is told that the beginning of the recording area has been reached and the logic circuit 72 then enables the magnetic head 18 to permit recording on the length of magnetic tape 15. Recording may then be continued until the hole 63 passes between the mirror 65 and the photocell 69, at which time the logic circuit 72 is told that the end of the tape is approaching and recording must soon be discontinued. When the first pattern of holes 57 at the end of the tape passes between the mirror 65 and the photocells 69 and 70 the photocells indicate to the logic circuit that the right end of the tape has been reached and the power is removed from the drive motor 20.

Now, again, if the cartridge is removed from the tape recorder and reinserted the patterns of holes 58 and 59 at the right end of the length of magnetic tape protect the tape from being pulled from the reel hub 13 if the drive motor 20 is activated in the same direction. With the cartridge in this condition, the magnetic tape being substantially transferred to the reel 12, the right end of the tape may serve as the beginning for a second recording track on the length of magnetic tape 15. For this reason the holes 61 and 63 are formed on the same level across the width of the tape and are spaced the same distance from the adjacent patterns of holes 53 and 57, respectively. Thus, when the tape is being transferred from reel 13 to reel 12 hole 61 serves as the load point to determine the beginning of recording and hole 63 serves as the early warning point to signal that recording should soon be ended, while when the tape is moved from reel 12 to reel 13 hole 63 serves as the load point and hole 61 serves as the early warning point.

In one specific example the cartridge was constructed for computer data transfer and storage. The distance between the physical ends of the tape and the first patterns of holes 55 and 59 and the distance between the patterns of holes were all 45 centimeters. The distance between the hole 61 and the adjacent pattern of holes 53 and the distance between the hole 63 and the adjacent pattern of holes 57 were both 90 centimeters. This latter distance was selected to be longer than the longest expected block of computer data which might begin to be recorded just prior to reaching the hole 61 or 63 so that the recording thereof could be completed.

I claim:

1. A magnetic tape recording and/or reproducing system comprising:

a cartridge shell defining an enclosure, a pair of reel hubs supported within said enclosure, a length of magnetic tape extending along a tape path within said enclosure and having its ends wound one on each of said reel hubs, said length of magnetic tape being formed adjacent each end with a repetitive pattern of holes, said patterns of holes at the two ends of said tape being different to distinguish the ends of the tape from each other, and said length of magnetic tape being formed with two additional sets of holes more centrally of said length of tape than and distinguishable from said repetitive patterns, one said additional set of holes being associated with each end of said length of tape, said additional sets of holes together demarking the ends of the desired recording area on said length of magnetic tape, means for moving said magnetic tape along said tape path from one of said reels and onto the other, a magnetic transducer for recording and/or reproducing magnetic signals on said magnetic tape as it is moved along said tape path, and means for detecting said holes in said magnetic tape and for distinguishing said patterns from each other and from said additional sets of holes to distinguish the ends of said length of tape from each other and from the desired recording area.

2. The magnetic recording system of claim 1 wherein said means for detecting said holes comprises a mirror positioned within said enclosure adjacent said tape path, a lamp positioned to transmit light to said mirror to be reflected therefrom against said tape and a plurality of photocells positioned to detect light reflected by said mirror against said tape and transmitted through said holes.

3. The magnetic recording system of claim 1 wherein said holes in each said pattern and each said set are in a line across the width of said tape.

* * * * *